United States Patent [19]
Kurple

[11] Patent Number: 6,084,003
[45] Date of Patent: Jul. 4, 2000

[54] PROCESS FOR MAKING FOAM USING PAINT SLUDGE

[76] Inventor: Kenneth R. Kurple, 9533 Springborn Rd., Anchorville, Mich. 48004

[21] Appl. No.: 09/286,542

[22] Filed: Apr. 5, 1999

Related U.S. Application Data

[60] Provisional application No. 60/080,691, Apr. 3, 1998, provisional application No. 60/080,694, Apr. 3, 1998, provisional application No. 60/080,698, Apr. 3, 1998, provisional application No. 60/080,699, Apr. 3, 1998, and provisional application No. 60/080,696, Apr. 3, 1998.

[51] Int. Cl.[7] .................................................. C08G 18/00
[52] U.S. Cl. ........................ 521/99; 521/46; 521/109.1; 521/155
[58] Field of Search ............................. 521/155, 109.1, 521/99, 46

[56] References Cited

U.S. PATENT DOCUMENTS

| | | | |
|---|---|---|---|
| 4,303,559 | 12/1981 | Trost | 521/48 |
| 4,472,230 | 9/1984 | Sachs et al. | 521/109.1 |
| 4,661,527 | 4/1987 | Seng | 521/55 |
| 5,352,709 | 10/1994 | Tarrant et al. | 521/109.1 |
| 5,684,053 | 11/1997 | Spangler | 521/45 |
| 5,710,199 | 1/1998 | Hubert et al. | 521/48 |
| 5,716,996 | 2/1998 | Ketterman et al. | 521/48 |
| 5,834,529 | 11/1998 | Reesie et al. | 521/109.1 |

*Primary Examiner*—Morton Foelak
*Attorney, Agent, or Firm*—Woodling, Krost & Rust

[57] ABSTRACT

Paint sludge is mixed with a polyether or polyester polyol. Optionally, lignin in the range of 0.25 to 70% by weight may be mixed with polyol. The paint sludge-polyol mixture is mixed with an isocyanate for curing the material into a mass. Alternatively, the lignin-polyol-paint sludge mixture is mixed with an isocyanate for curing the material into a mass. The lignin improves the flame resistance and moisture resistance of the mass. A catalyst may be added to the mixture to improve the rate of reaction.

41 Claims, No Drawings

PROCESS FOR MAKING FOAM USING PAINT SLUDGE

This patent application claims priority of U.S. application Nos. 60/080,691, 60/080,694, 60/080,698, 60/080,692, 60/080,699, and 60/080,696 filed Apr. 3, 1998.

At the present time when a car or truck or other vehicle or object is painted at an assembly plant there is a considerable amount of paint that does not become a part of the car or truck but rather this paint is overspray and becomes sludge.

There are a variety of different colors of paints and the different types of paints such as primers, base coats, topcoats and clearcoats. Therefore the paint sludge can be a mixture of various components, various pigments and various resins. However, the cost to separate this paint into its independent resin or pigment components is too expensive to be commercially successful. Also these paint sludges are now being considered as a toxic waste and must be sent to toxic waste landfills which is quite expensive. This cost will be ever increasing.

However, the present invention that is being disclosed makes it possible to use this paint sludge waste as an ingredient for valuable products in very large commercial markets. What has been discovered is that paint sludge can be mixed with polyols.

Lignin can, optionally, be pre-mixed with the polyol. The lignin may be between 0.25 to 70% by weight of the polyol-lignin mixture. The lignin improves the suspension of the paint sludge and enables blending with as much paint sludge as possible to reduce costs. Lignin also acts as a flame retardant in the final product.

The paint sludge-polyol-lignin and/or paint sludge-polyol mixture is then mixed with a suitable isocyanate and then placed by various methods into an appropriate pattern or mold to produce a useful part or foam.

It has been discovered that very significant amounts of this paint sludge can be blended with polyols and reacted with the appropriate isocyanate to produce urethane parts which have useful properties.

Water is the preferred blowing agent although chlorofluorocarbons and/or hydrocarbons can be used. The blowing agents are used to vary the density of the foam produced. The following examples are illustrative of the invention.

EXAMPLE 1
Procedure: 100 parts of Polyol WL440 (a polyether polyol) and 10 parts of paint sludge are blended in an appropriate mixer. The homogenous mixture and 70 parts of Rubinate M (a polymeric isocyanate) are blended quickly, and poured into an appropriate mold or pattern. WL440 is made by Huntsman Chemical and Rubinate M is made by ICI.

EXAMPLE 2
Procedure: 100 parts of Terate 2031 (a polyester polyol) and 10 parts of paint sludge are blended in an appropriate mixer. The homogenous mixture and 70 parts of Rubinate M (a polymeric isocyanate) are blended quickly, and poured into an appropriate pattern or mold. Terate 2031 is made by Hoechst-Celanese.

EXAMPLE 3
Procedure: 100 parts of WL440 (a polyether polyol), 10 parts of paint sludge and 0.5 parts of the wetting agent, anti-terra U-80 are blended in an appropriate mixer. The wetting agent functions as a dispersant. The mixture and 80 parts of Rubinate M (a polymeric isocyanate) are mixed, and produce a foam product. The wetting agent, anti-terra U-80 is made by Byke-Chemie. Surfanol 104, a surfactant, may be used instead of a wetting agent and/or in combination with a wetting agent such as anti-terra U-80.

EXAMPLE 4
Procedure: 100 parts of Polyol WL440, 10 parts of lignin, and 10 parts of paint sludge are blended in an appropriate mixer. The polyol and the lignin are pre-mixed until the lignin is dissolved. Then, the paint sludge is blended with the mixture of lignin-polyol mixture. Next, 1 part of water which acts a blowing agent is added to the polyol-lignin-paint sludge mixture. Finally, the mixture and 80 parts of Rubinate M (a polymeric isocyanate) are mixed, and poured into an appropriate pattern or mold.

EXAMPLE 5
Procedure: 100 parts of a polyether polyol and 10 parts of lignin are blended in an appropriate mixer. Then, 10 parts of paint sludge are blended with the lignin-polyol mixture. Next, 5 parts of Forane 141B which acts as a blowing agent is added to the polyol-lignin-paint sludge mixture. Finally, the mixture and 100 parts of a polymeric isocyanate are mixed, and poured into an appropriate pattern or mold. Forane 141B is made by Elf Atchem.

EXAMPLE 6
Procedure: This procedure uses an amine catalyst. 100 parts of WL440 polyether polyol and 10 parts of lignin are blended in an appropriate mixer. Then, 10 parts of paint sludge are blended with the lignin-polyol mixture. Next, 0.3 parts of 33LV, an amine catalyst, are added to the polyol-lignin-paint sludge mixture. Finally, the mixture and 80 parts of Rubinate M (a polymeric isocyanate) are mixed, and poured into an appropriate patter or mold. 33LV is made by Air Products.

EXAMPLE 7
Procedure: This procedure uses a tin catalyst. 100 parts of a polyether polyol and 10 parts of paint sludge are blended. Next, 0.001 parts of T-12 (tin catalyst) are added to the polyol and paint sludge mixture. Finally, the mixture and 100 parts of a polymeric isocyanate are mixed, and poured into an appropriate pattern or mold. T-12 is made by Air Products.

EXAMPLE 8
Procedure: This procedure uses both polyester and polyether polyols. 50 parts of a polyester polyol, 50 parts of polyether polyol, and 10 parts of paint sludge are blended. The mixture and 80 parts of Rubinate M (a polymeric isocyanate) are mixed, and poured into an appropriate pattern or mold.

The invention has been described by way of example above. Those skilled in the art will recognize that many different embodiments of the invention may be employed without departing from the spirit and scope of the invention set forth by the claims which follow hereinbelow.

What is claimed is:

1. A process for making a mass such as a foam comprising the steps of:
   mixing polyol and lignin together;
   mixing the polyol-lignin mixture with paint sludge;
   mixing the polyol-lignin-paint sludge mixture with an isocyanate;
   pouring the mixture into a mold forming a mass.

2. A process as claimed in claim 1 wherein the polyol is a polyether polyol.

3. A process as claimed in claim 1 wherein the polyol is a polyester polyol.

4. A process as claimed in claim 1 wherein the lignin comprises 0.25 to 70% by weight of said polyol-lignin mixture.

5. A process as claimed in claim 1 wherein the lignin contains less than 15% sodium.

6. A process as claimed in claim 1 further comprising the step of mixing a blowing agent with said polyol-lignin-paint sludge mixture.

7. A process as claimed in claim 6 wherein said blowing agent is water.

8. A process as claimed in claim 1 further comprising the step of mixing an amine catalyst with said lignin-polyol-paint sludge-isocyanate mixture to increase the rate of reaction.

9. A process as claimed in claim 1 further comprising the step of mixing a tin catalyst with said lignin-polyol-paint sludge-isocyanate mixture to increase the rate of reaction.

10. A process as claimed in claim 1 further comprising the step of mixing a tin catalyst and an amine catalyst with said lignin-polyol-paint sludge-isocyanate mixture to increase the rate of reaction.

11. A process as claimed in claim 6 wherein the blowing agent is a hydrocarbon.

12. A process as claimed in claim 6 wherein the blowing agent is a chlorofluoro hydrocarbon.

13. A process as claimed in claim 6 wherein the blowing agent is a fluorocarbon hydrocarbon.

14. A process as claimed in claim 1 wherein the polyol is a combination of polyether and polyester polyols.

15. A process as claimed in claim 6 wherein the blowing agent is a water.

16. A process as claimed in claim 1 where the isocyanate is an isocyanate terminated polymer.

17. A process as claimed in claim 1 wherein the functionality of the isocyanate is 2 or greater.

18. A process is claimed in claim 2 wherein the polyether polyol is made from propylene oxide and ethylene oxide.

19. A process as claimed in claimed 1 wherein the polyester polyol is made from propylene oxide and ethylene oxide.

20. A process for making a mass such as a foam comprising the steps of:

mixing a polyol with a paint sludge; and, mixing the polyol-paint sludge mixture with an isocyanate which produces a mass.

21. A process as claimed in claim 20 wherein the polyol is a polyether polyol.

22. A process as claimed in claim 20 wherein the polyol is a polyester polyol.

23. A process as claimed in claim 20 wherein the polyol is a combination of a polyether polyol and a polyester polyol.

24. A process for making a mass such as a foam as claimed in claim 20 further comprising the steps of premixing the polyol with lignin to improve the flame resistance and suspension of the paint sludge within the mixture.

25. A process for making a mass such as a foam as claimed in claim 20 further comprising the steps of premixing the polyol with lignin to improve the moisture resistance and suspension of the paint sludge within the mixture.

26. A process for making a mass such as a foam as claimed in claim 20 further comprising the steps of adding a dispersant to said polyol.

27. A process for making a mass such as a foam as claimed in claim 20 further comprising the steps of adding a surfactant to said polyol.

28. A process for making a mass such as a foam as claimed in claim 20 further comprising the steps of adding a dispersant in combination with a surfactant to said polyol.

29. A process as claimed in claim 20 further comprising the step of mixing a blowing agent with said polyol-paint sludge mixture.

30. A process as claimed in claim 29 wherein said blowing agent is water.

31. A process as claimed in claim 20 further comprising the step of mixing an amine catalyst with said polyol-paint sludge-isocyanate mixture to increase the rate of reaction.

32. A process as claimed in claim 20 further comprising the step of mixing a tin catalyst with said polyol-paint sludge-isocyanate mixture to increase the rate of reaction.

33. A process as claimed in claim 20 further comprising the step of mixing a tin catalyst and an amine catalyst with said polyol-paint sludge-isocyanate mixture to increase the rate of reaction.

34. A process as claimed in claim 29 wherein the blowing agent is a hydrocarbon.

35. A process as claimed in claim 29 wherein the blowing agent is a chlorofluoro hydrocarbon.

36. A process as claimed in claim 29 wherein the blowing agent is a fluorocarbon hydrocarbon.

37. A process as claimed in claim 29 wherein the blowing agent is a water.

38. A process as claimed in claim 20 wherein the isocyanate is an isocyanate terminated polymer.

39. A process as claimed in claim 20 wherein the functionality of the isocyanate is 2 or greater.

40. A process is claimed in claim 22 wherein the polyether polyol is made from propylene oxide and ethylene oxide.

41. A process as claimed in claimed 22 wherein the polyester polyol is made from propylene oxide and ethylene oxide.

* * * * *